United States Patent
Ishida et al.

(10) Patent No.: US 6,551,500 B1
(45) Date of Patent: Apr. 22, 2003

(54) HYDROCRACKING CATALYST, PRODUCING METHOD THEREOF, AND HYDROCRACKING METHOD

(75) Inventors: Katsuaki Ishida, Toda (JP); Toru Saito, Toda (JP); Manabu Kobayashi, Toda (JP); Kaori Matsuzawa, Toda (JP)

(73) Assignee: Japan Energy Corporation, Tokyo (JP)

( * ) Notice: Subject to any disclaimer, the term of this patent is extended or adjusted under 35 U.S.C. 154(b) by 0 days.

(21) Appl. No.: 09/530,445

(22) PCT Filed: Aug. 31, 1999

(86) PCT No.: PCT/JP99/04722

§ 371 (c)(1),
(2), (4) Date: Jul. 27, 2000

(87) PCT Pub. No.: WO00/12213

PCT Pub. Date: Mar. 9, 2000

(30) Foreign Application Priority Data

Sep. 1, 1998 (JP) .......................... 10-246458

(51) Int. Cl.⁷ .......................... C10G 47/02; B01J 21/00
(52) U.S. Cl. .............................. 208/111.3; 208/111.35; 208/111.01; 208/108; 502/305; 502/313; 502/314; 502/325; 502/332; 502/79
(58) Field of Search .................. 208/108, 111.01, 208/111.3, 111.35, 216 PP; 502/305, 313, 314, 325, 332, 79

(56) References Cited

U.S. PATENT DOCUMENTS

| | | | | |
|---|---|---|---|---|
| 4,048,060 A | * | 9/1977 | Riley | 208/210 |
| 4,115,248 A | * | 9/1978 | Mulaskey | 208/108 |
| 4,225,421 A | * | 9/1980 | Hensley et al. | 208/112 |
| 4,456,701 A | * | 6/1984 | Chen | 502/221 |
| 4,652,545 A | * | 3/1987 | Lindsley | 208/216 PP |
| 4,738,944 A | * | 4/1988 | Robinson et al. | 208/216 PP |
| 4,969,990 A | * | 11/1990 | Simpson | 208/208 R |
| 5,277,794 A | * | 1/1994 | Delaney et al. | 208/143 |
| 5,393,409 A | | 2/1995 | Jan et al. | 208/108 |
| 5,435,908 A | | 7/1995 | Nelson et al. | 208/216 PP |
| 5,514,274 A | * | 5/1996 | Simpson | 208/216 PP |
| 5,543,035 A | | 8/1996 | Ziemer | |
| 5,545,602 A | | 8/1996 | Nelson et al. | |

FOREIGN PATENT DOCUMENTS

| | | |
|---|---|---|
| DE | 2817839 A | 10/1979 |
| EP | 0 247 679 A2 | 12/1987 |
| EP | 0590894 A | 4/1994 |
| EP | 0714699 A2 | 6/1996 |
| GB | 2087747 A | 6/1982 |
| JP | 5-36099 | 5/1993 |
| JP | 6-190278 | 7/1994 |

OTHER PUBLICATIONS

Julius Scherzer, A. J. Gruia, "Hydrotracking Science and Technology," Mercel Dekker Inc., New York, 1996 (pp. 107–111).

Takabo Shirozaki, Takayuki Todo, editors, "Catalyst Preparation," Kodansha, 1974 (pp. 23–24).

* cited by examiner

*Primary Examiner*—Walter D. Griffin
(74) *Attorney, Agent, or Firm*—Birch, Stewart, Kolasch & Birch, LLP (57) ABSTRACT

A hydrocracking catalyst has a carrier that has particles of a compound oxide and a binder present between these particles, and at least one metal component selected from Group 6, Group 9 or Group 10 of the Periodic Table supported on the carrier. The catalyst has a median pore diameter of 40 to 100 Å and the volume of pores whose pore diameter falls within a range of 40 to 100 Å is at least 0.1 mL/g. Moreover, the volume of pores of the catalyst whose pore diameter falls within a range of 0.05 to 5 μm is 0.05 to 0.5 mL/g, and the volume of pores whose pore diameter is 0.5 to 10 μm is less than 0.05 mL/g. This catalyst is mechanically strong enough for practical use and has a high conversion rate and middle distillate selectivity in hydrocracking of hydrocarbon oils, particularly vacuum gas oil.

18 Claims, 1 Drawing Sheet

HYDROCRACKING CATALYST, PRODUCING METHOD THEREOF, AND HYDROCRACKING METHOD

This application is the national phase under 35 U.S.C. §371 of PCT International Application No. PCT/JP99/04722 which has an International filing date of Aug. 31, 1999, which designated the United States of America.

TECHNICAL FIELD

The present invention relates to a method of hydrocracking of hydrocarbon oils, and a catalyst that is suitable for hydrocracking of hydrocarbon oils and a method of its production. The present invention particularly relates to a method of hydrocracking with which the vacuum gas oil fractions can be efficiently converted to light gas oil by hydrocracking, as well as a catalyst that is suitable for hydrocracking of the vacuum gas oil fractions and a method of its production.

BACKGROUND ART

The demand for oil has recently shifted toward gas oils. Although gasoline and naphtha can be mass-produced by fluidized catalytic cracking, kerosene, gas oil, jet fuel, etc., which are referred to as middle distillates, of preferred quality are not obtained by fluidized catalytic cracking. Therefore, the method of hydrocracking of vacuum gas oil is often used for mass-production of high-quality middle distillates in the oil refining industry.

Although the desired fraction can be obtained by bringing the crude oil and catalyst into contact at a high temperature in the presence of hydrogen under high pressure in the field of hydrocracking of vacuum gas oil, selection of the reaction conditions and catalyst for this is important. For example, more severe reaction conditions or a catalyst of a hydrogenation active metal species supported on a carrier with a higher content of solid, strongly acidic zeolite can be used in order to improve the conversion rate. Nevertheless, when a reaction is performed using this type of catalyst, there is a disadvantage in that although the conversion rate is increased, large quantities of gas and naphtha are produced and selectivity of the middle distillates therefore is poor.

Therefore, taking into consideration diffusibility of the hydrocarbon molecules that will react, attention is given to the fine pore distribution of the catalyst in designs of catalysts that efficiently produce middle distillate (Julius Scherzer, A. J. Gruia, 'Hydrocracking Science and Technology,' Mercel Dekker, Inc., New York, 1996). For instance, Japanese Patent Application Laid Open No. 06-190278 discloses that a hydrocracking catalyst of a hydrogenation active metal supported on a carrier consisting of boria, silica, and alumina with an average pore diameter of 90 to 120 Å is suitable for obtaining high middle distillate selectivity. Thus, improving middle distillate selectivity by taking into consideration the pore diameter distribution of so-called mesopores is a technology that is known in this field.

On the other hand, hydrocracking catalysts that are packed in fixed bed reactors and used industrially are usually shaped into cylinders or spheres. Technology where there are so-called macropores of 0.05 μm or larger present in this type of shaped catalyst is also known. For example, Japanese Patent Publication No. 05-36099 discloses a catalyst obtained by supporting hydrogenation active component on a carrier consisting of an alumna inorganic oxide and zeolite in order to hydrogenate mainly heavy hydrocarbons such as atmospheric residue. This Japanese Patent Application Laid Open discloses the fact that because this catalyst has macropores with a pore diameter of 600 Å or larger at 0.1 mL/g or more, deposition of carbonaceous matter and metal impurities and plugging of pores caused by the deposition can be prevented and as a result, yield of the kerosene and gas oil is improved.

Nevertheless, in general, shaped catalysts with macropores generally have a disadvantage in that their mechanical strength is weak because porosity is high (Takabo Shirozaki, Takayuki Todo, editors, "Catalyst Preparation," Kodansha, 1974) and therefore, the problem easily develops where the catalyst is broken down and crushed when catalyst is produced and packed in the reactor or during the reaction.

To the inventors' knowledge, there is still no technology whereby a hydrocracking catalyst is simultaneously given a specific mesopore diameter distribution and a specific macropore diameter distribution and the hydrocracking catalyst is used for hydrocracking of hydrocarbon oils, preferably demetalized hydrocarbon oils that mainly contain fractions with boiling points which is higher than a predetermined boiling point, particularly vacuum gas oil or heavy gas oil.

DISCLOSURE OF THE INVENTION

The purpose of the present invention is to provide a new hydrocracking catalyst with a high conversion rate and middle distillate selectivity in hydrocracking of hydrocarbon oils, particularly vacuum gas oil and heavy gas oil, and practical mechanical strength, and to provide a method of producing this catalyst as well as a method of hydrocracking using this hydrocracking catalyst.

The hydrocracking catalyst of the present invention is provided, which comprises a catalyst carrier having particles of a compound oxide and a binder component present between these particles, and at least one metal component selected from Group 6(VI), Group 9(IX) and Group 10(X) of the Periodic Table, wherein (A) the median pore diameter of the catalyst is 40 to 100 Å and the volume of pores whose pore diameter is within a range of 40 to 100 Å is at least 0.1 mL/g and (B) the volume of pores whose pore diameter is within a range of 0.05 to 0.5 μm of the catalyst is 0.05 to 0.5 mL/g and the volume of pores with a pore diameter of 0.5 to 10 μm is less than 0.05 mL/g.

The compound oxide is preferably made up of one or more selected from silica-alumina, silica-titania, silica-zirconia, silica-magnesia, silica-alumina-titania, and silica-alumina-zirconia. Also, the compound oxide is preferably made up of one or more selected from silica-alumina, silica-titania, silica-zirconia, silica-magnesia, silica-alumina-titania, and silica-alumina-zirconia; and USY zeolite.

Moreover, the binder component is made from alumina and/or boria-alumina, and the metal component is preferably one or more of molybdenum, tungsten, cobalt, rhodium, iridium, nickel, palladium, and platinum, and furthermore, it is preferred that at least 60% of the compound oxide particles have a diameter of 10 μm or smaller.

The method of producing a hydrocracking catalyst (hydrocracking catalyst composition) of the present invention comprises the steps of mixing compound oxide powder comprising at least 60% powder with a particle diameter of 10 μm or smaller and binder component; shaping, drying and firing the mixture to form the carrier; and supporting at least one metal component selected from Group 6, Group 9 and Group 10 of the Periodic Table on the carrier, and thereby obtaining a hydrocracking catalyst wherein (A) median pore diameter is 40 to 100 Å and the volume of pores whose pore diameter is within a range of 40 to 100 Å is at least 0.1 mL/g and (B) volume of pores whose pore diameter is within a range of 0.05 to 0.5 $\mu$m is 0.05 to 0.5 mL/g and volume of pores with a pore diameter of 0.5 to 10 $\mu$m is less than 0.05 mL/g.

By means of the above-mentioned production method, the binder component is made from one or more selected from hydrated aluminium oxide or boria-containing hydrated aluminium oxide.

The method of hydrocracking hydrocarbon oils in accordance with the present invention is a method with which hydrocarbon oils can be converted to a product in which the fraction with a relatively high boiling point contained in this hydrocarbon oil has been reduced by bringing the hydrocarbon oil into contact with the above-mentioned hydrocracking catalyst of the present invention in the presence of hydrogen.

BRIEF DESCRIPTION OF THE INVENTION

BESTMODE FOR CARRYING OUT THE INVENTION

The details of the hydrocracking catalyst and hydrocracking method of the present invention will be described below based on the pore properties of the catalyst, the structural materials of the catalyst, the method of producing the catalyst and the hydrocracking reaction, etc.

[Pore Properties of the Hydrocracking Catalyst]

The hydrocracking catalyst of the present invention is characterized in that it has pore properties that satisfy both conditions (A) and (B) below:

(A) the median pore diameter of the catalyst is 40 to 100 Å and the volume of pores whose pore diameter is within a range of 40 to 100 Å is at least 0.1 mL/g and (B) the volume of pores whose pore diameter is within a range of 0.05 to 0.5 $\mu$m of this catalyst is 0.05 to 0.5 mL/g and the volume of pores with a pore diameter of 0.5 to 10 $\mu$m is less than 0.05 mL/g.

The so-called mesopore properties, that is, pore properties pertaining to above-mentioned condition (A), are determined by the nitrogen gas adsorption method and the correlation between pore volume and pore diameter can be calculated by the BJH method, etc. Moreover, median pore diameter is the pore diameter where cumulative pore volume from the side where pore diameter is larger becomes V/2 when pore volume obtained under conditions of a relative pressure of 0.9667 by the nitrogen gas adsorption method is V. The median pore diameter of the hydrocracking catalyst is within a range of 40 to 100 Å, and further, a median pore diameter within a range of 45 to 90 Å, particularly, a median pore diameter within a range of 50 to 85 Å, is preferred. The volume of pores whose pore diameter is within a range of 40 to 100 Å is at least 0.1 mL/g, and this pore volume is preferably 0.1 to 1.0 mL/g, particularly 0.15 to 0.6 mL/g.

The above-mentioned mesopore properties of the hydrocracking catalyst can be obtained basically by controlling the pore diameter of the compound oxide to have such mesopore properties, because the mesopore properties of the compound oxide is usually maintained until the catalyst is made by the compound oxide.

So-called macropore properties, that is, the pore properties related to above-mentioned condition (B), can be determined using the mercury intrusion porosimetry and can be calculated assuming that the angle of contact of mercury is 140°, surface tension is 480 dynes/cm, and that all of the pores have cylindrical shape. A hydrocracking catalyst where the volume of pores with a diameter of 0.05 to 1 $\mu$m is 0.05 to 0.5 mL/g and the volume of pores with a diameter of 1 $\mu$m or larger is less than 0.05 mL/g is used. It is further preferred that the volume of pores with a diameter of 0.05 to 0.5 $\mu$m be 0.04 to 0.5 mL/g, particularly 0.05 to 0.5 mL/g, and that the volume of pores with a diameter of 1 $\mu$m or larger be less than 0.05 mL/g, further, less than 0.02 mL/g, particularly 0.01 mL/g because mechanical strength of the catalyst will be increased.

The macropore properties can be controlled by voids formed between the compound oxide particles and a loading rate of the voids with a binder. The voids formed between the compound oxide particles are controlled by the diameters of the compound oxide particles. The loading rate is controlled by mixing ratio or weight ratio of the binder and the compound oxide, which will be described later.

The mesopore and macropore properties may also be influenced by the characteristic of the binder and a condition of kneading process which will be described later.

[Compound Oxide]

The compound oxide used in the present invention is a compound oxide with solid acidity. Several of these compound oxides are known, beginning with the 2-element compound oxides confirmed to be acidic by K. Shibata, T., Kiyoura, J. Kitagawa, K. Tanabe, Bull. Chem. Soc. Jpn., 46, 2985 (1973), but silica-alumina, silica-titania, silica-zirconia and silica-magnesia are preferably used. Silica-alumina-titania and silica-alumina-zirconia are preferably used as the 3-element compound oxides. In addition, the compound oxide of the present invention can also contain zeolite, such as USY zeolite, etc.

USY zeolite is ultra-stable Y zeolite. It is Y zeolite characterized by its alkali metal ion content of under 4 wt %, preferably under 1 wt %, its lattice constant of less than 24.50 Å, and its silica ($SiO_2$)/alumina ($Al_2O_3$) molar ratio of 5 or higher.

In case that a powder form of compound oxide other than USY zeolite is used as the starting material for producing a hydrocracking catalyst, the pore properties of the hydrocracking catalyst of the present invention are easily obtained when the volume of pores with a pore diameter within a range of 40 to 100 Å is at least 0.1 mL/g and median pore diameter is within a range of 35 to 100 Å. A powder with a median pore diameter within a range of 40 to 90 Å is further preferred, and one with a median pore diameter within a range of 45 to 85 Å is particularly preferred. Moreover, as long as the above-mentioned pore properties are satisfied, a compound oxide powder with a larger relative surface area is preferred. Basically, a powder specific surface area of 250 $m^2/g$ or larger is preferred, 300 $m^2/g$ or larger is further preferred, and 350 $m^2/g$ or larger is particularly suitable.

When the compound oxide of the present invention is used in powder form, it is preferred that a compound oxide at least 60% of which is particle aggregates with a diameter of 10 $\mu$m or less be used because the macropore properties of the present invention can be easily obtained and a catalyst with sufficient mechanical strength will be easily obtained. If a powder of 2 or more compound oxides is used, overall, at least 60% of the powder should be particle aggregates with a diameter of 10 μm or smaller, and 60% or more, particularly 70% or more, preferably has a diameter of 1 to 10 μm. Particle diameter of the particle aggregates can be determined by the method whereby the particle groups dispersed in water are irradiated with laser light and diameter is found from this scattered light. Moreover, a compound oxide powder that has been pre-treated by dry crushing or wet crushing to bring the percentage of particle aggregates with a diameter of 10 μm or smaller to at least 60% can also be used. Compound oxide is present as particles with almost the same size as the size of the particle aggregates in the catalyst using particle aggregates of compound oxide.

[Binder Component]

The binder component used by the present invention should be made from alumina and/or boria-alumina. The alumina here is aluminum oxide, aluminum hydroxide and/or hydrated aluminium oxide. The boria-alumina is aluminum oxide, aluminum hydroxide and/or boria-containing hydrated aluminum oxide. The boria-alumina can also include boria as a mixture, and it can be comprised as a solid-solution or a combined compound.

The binder component that is a starting material of the carrier is preferably a powder consisting of aluminum hydroxide and/or hydrated aluminium oxide (referred to below simply as alumina powder), particularly hydrated aluminium oxide with a boehmite structure, such as pseudo-boehmite, etc., because when this is used, hydrocracking activity and middle distillate selectivity can be improved. Moreover, it is preferred that the binder component be a powder that consists of aluminum hydroxide or boria-containing hydrated aluminium oxide (referred to below simply as boria-alumina powder), particularly hydrated aluminium oxide with a boehmite structure, such as pseudo-boehmite, including boria because hydrocracking activity and middle distillate selectivity will be improved.

The weight of the binder component is preferably 5 to 50 wt %, particularly 15 to 35 wt %, of the total weight of compound oxide component and binder component making up the catalyst. If it is less than this range, there will be a reduction in mechanical strength of the catalyst, and when it exceeds this range, there will be a relative reduction in hydrocracking activity and in middle distillate selectivity. When USY zeolite is used as the compound oxide, the weight of USY zeolite component is preferably 0.1 to 30 wt %, particularly 0.2 to 20 wt %, of the total weight of the compound oxide component and the binder component making up the catalyst. If it is less than this range, it will be difficult to realize improvement of hydrocracking activity with the use of USY zeolite, and if it exceeds this range, there will be a relative drop in middle distillate selectivity. When silica-alumina is used as the compound oxide, the weight of alumina is 10–60 wt % of silica-alumina or molar ratio of silica/alumina is 1–20.

[Metal Component]

The hydrocracking catalyst of the present invention comprises one or more metal components selected from Group 6, Group 9 and Group 10 of the Periodic Table. Molybdenum, tungsten, cobalt, rhodium, iridium, nickel, platinum, and palladium are particularly suitable as the metal selected from Group 6, Group 9, and Group 10 of the Periodic Table used in the catalyst of the present invention. These metals can be used as one component or a mixture of 2 or more components. These metals are preferably added so that the total amount of Group 6, Group 9 or Group 10 metal contained in the hydrocracking catalyst is 0.05 to 35 wt %, particularly 0.1 to 30 wt %. When molybdenum is used as the metal, the amount added is preferably 5 to 20 wt % of the hydrocracking catalyst. When tungsten is used, the amount added is preferably 5 to 30 wt % of the hydrocracking catalyst. If the amount of molybdenum or tungsten is less than the above-mentioned range, hydrogenation capability of the active metal necessary for hydrocracking will be insufficient and this therefore is not preferred. On the other hand, if the amount added is outside the above-mentioned range, aggregation of the active metal component that has been added will easily occur and this therefore is not preferred. It is further preferred that cobalt or nickel be added when molybdenum or tungsten are used as the metal because hydrogenation capability of the active metal will improve. The total amount of cobalt or nickel added in this case is preferably 0.5 to 10 wt % of the hydrocracking catalyst. When one or more of rhodium, iridium, platinum, and palladium is used as the metal, the amount added is preferably 0.1 to 5 wt %. If it is less than this amount, this is not preferred because sufficient hydrogenation capability will not be obtained and exceeding this range is uneconomic.

[Preparing the Hydrocracking Catalyst]

The ratio of the total of the number of moles of elements other than aluminum in terms of oxide (for instance, number of moles of $SiO_2$, $TiO_2$, $ZrO_2$, and MgO) and the number of moles in terms of oxide of aluminum (number of moles of $Al_2O_3$) in compositions of elements other than metal elements of Group 6, Group 9, and Group 10 and boron, carbon, hydrogen, nitrogen and oxygen in the hydrocracking catalyst of the present invention is preferably within a range of 0.5 to 10, further, within a range of 0.7 to 7. A ratio less than this range or exceeding this range is not preferred because there will be a reduction in hydrocracking activity, middle distillate selectivity and catalyst mechanical strength.

[Method of Producing Hydrocracking Catalyst]

The catalyst that is made in this way can be obtained by kneading and shaping the compound oxide powder and binder component and drying and firing (baking) to obtain the carrier and further impregnating and supporting the metal component and then drying and firing. However, another method can be used as long as a catalyst with the desired pore properties can be made.

A kneading machine generally used for catalyst preparation can be used for kneading. The method whereby the starting materials are introduced and water is added and the contents are mixed with mixing blades is usually preferred, but there are no particular limitations to the order in which the starting materials and additives are introduced, etc. Ordinary water is used for kneading, and it is not particularly necessary to add water when the starting materials are in slurry form. Moreover, the liquid that is added can also be an organic solvent such as ethanol, isopropanol, acetone, methyl ethyl ketone, methyl isobutyl ketone, etc. The temperature during kneading and kneading time vary with the compound oxide and binder component used as the starting materials, and there are no special limitations as long as they are conditions under which the desired pore structure is obtained. Similarly, as long as it is within a range with which the properties of the catalyst of the present invention are retained, it is possible to add and knead an acid such as sulfuric acid, a base such as ammonia, an organic compound such as citric acid or ethylene glycol, a water-soluble polymer compound such as cellulose ether or polyvinyl alcohol, ceramic fibers, etc.

Shaping after kneading can be performed using shaping methods generally used for catalyst preparation. It is preferred that shaping be performed by extrusion shaping with a screw extruder, etc., with which any shape, such as pellets, etc., can be efficiently shaped, or by the oil drop method with which shaping into spherical shape can be efficiently accomplished. There are no special limitations to the size of the shaped article, but when it is, for instance, cylindrical pellets, pellets that have a diameter of 0.5 to 20 mm and a length of 0.5 to 15 mm can usually be easily obtained.

The shaped article obtained as previously described is dried and fired to produce the carrier. This firing treatment is preferably firing for 0.1 to 20 hours at a temperature of 300 to 900° C. in air or a gas atmosphere such as nitrogen, etc.

There are no special limitations to the method of supporting metal component on the carrier and impregnation methods by spraying or immersion, etc., ion exchange methods, etc., are suitable. Moreover, more metal component can be supported by repeating the support treatment and drying treatment. It is preferred that the hydrocracking catalyst of metal component supported on a carrier be fired for 0.1 to 20 hours at a temperature of 300 to 900° C. in air or a gas atmosphere such as nitrogen because activity of the catalyst will be increased.

[Mechanical Strength of Hydrocracking Catalyst and Carrier]

Mechanical strength of the hydrocracking catalyst in terms of the edge (side) collapsing strength of cylindrical pellets with a diameter of 1.6 mm is 3 kg or higher, preferably 4 kg or higher. Moreover, when a catalyst is made by supporting the metal component by impregnation once the carrier has been made by shaping, it is preferred that the shaped carrier have sufficient mechanical strength to obtain a catalyst with good yield, and mechanical strength of the shaped carrier of the present invention is 3 kg or stronger, preferably 4 kg or stronger, in terms of side crushing strength of cylindrical pellets with a diameter of 1.6 mm.

[Hydrocracking Method]

The method of hydrocracking hydrocarbon oils by the present invention is a method whereby hydrocarbon oil is brought into contact with the above-mentioned type of catalyst in the presence of hydrogen when the starting hydrocarbon oil is converted to a product in which the fractions with a relatively high boiling point, or the fractions with a boiling point above a specific temperature, contained in this hydrocarbon oil are reduced.

There are no special limitations to the hydrocarbon oil that can be used as the starting material, but one containing 80 wt % or more fractions with a boiling point of 250° C. or higher is preferably used. There are no special limitations to the source of the hydrocarbon oil that can be used as the starting material, but oils derived from crude oil, coal liquefaction oil, oil shale, oil sand, etc., and Fischer-Tropsch synthetic oil, etc., are preferably used. The hydrocarbon oil that is used as the starting material may comprise impurities other than hydrocarbons, but a lower impurity content is preferred, and it is preferred that hydrocarbon oil that has been pre-treated by hydrotreating, such as desulfurization, denitrification, and demetalization, and by deasphalting be used. Materials with which the original pore diameter can be retained because metal substances do not deposit in the mesopore and macropores are particularly preferred. Actually, a starting oil with both a vanadium content and nickel content of 0.0005 wt % or less, preferably 0.0002 wt %, more preferably 0.0001 wt %, is suitable.

By means of the method of hydrocracking hydrocarbon oils of the present invention, the starting hydrocarbon oil is converted to a product with which the fractions having a boiling point higher than a specific temperature are reduced, and this specific temperature can be selected from any temperature in accordance with the desired product. It is preferred that a temperature of 180° C. to 400° C. be selected. Moreover, the hydrocarbon oil used as the starting material should be selected so that it contains 50 wt % or more, preferably 80 wt % or more, particularly 90 wt % or more, of fraction with a boiling point that is above the specific temperature selected here.

By means of the method of hydrocracking of hydrocarbon oils of the present invention, catalyst is packed into the reaction vessel and then pre-treated by drying, reduction, sulfiding, etc., and used. It is particularly preferred that sulfiding treatment be performed before the catalyst is used in hydrocracking when it comprises an element of Group 6 as the metal component.

By means of the method of hydrocracking a hydrocarbon oil of the present invention, hydrocracking is performed in the presence of hydrogen, and it is preferred that this be performed under increased pressure so that overall pressure is 2 MPa to 30 MPa. The liquid hourly space velocity (LHSV) used for hydrocracking of hydrocarbon oils by the present invention is 0.2 $h^{-1}$ to 5.0 $h^{-1}$, particularly 0.3 $h^{-1}$ to 3.0 $h^{-1}$. The hydrogen/starting oil feed ratio suitable for hydrocracking of hydrocarbon oil by the present invention is 100 NL/L to 5,000 NL/L. By means of the method of hydrocracking hydrocarbon oil by the present invention, the reaction should be performed at a temperature of 250° C. to 500° C., particularly 300° C. to 450° C.

EXAMPLES

The catalyst and method of its production, as well as hydrocracking method, of the present invention will now be explained in detail with working examples and comparative examples.

[Catalyst A]

As will be described below, catalyst A consisting of 11.0 wt % W, 1.0 wt % Ni, 67.9 wt % silica-alumina, and 17.0 wt % alumina was prepared.

First, 1,136 g silica-alumina powder (silica/alumina molar ratio of 7.4, 93.4 wt % of which was powder of particle aggregates with a diameter of 1 to 10 μm, ignition loss of 16.4 wt %) and 325 g pseudo-boehmite powder (ignition loss of 27.0 wt %) were kneaded while being mixed, and shaped into a cylindrical shape by extrusion from a round opening with a diameter of 1.6 mm. Then a carrier of a silica-alumina/alumina mixture was prepared by drying this shaped article for 15 hours at 130° C. and then firing for 1 hour at 600° C. under an air flow. The mean edge collapsing strength of this carrier was 6.3 kg.

The carrier was impregnated by spraying with an aqueous ammonium metatungstate solution and dried for 15 hours at 130° C. Then it was impregnated by spraying with an aqueous nickel nitrate solution and dried for 15 hours at 130° C. Next, it was fired for 30 minutes at 500° C. under an air flow. Catalyst A was thereby obtained.

When the pore properties of this catalyst A were measured by nitrogen gas adsorption, the volume of pores with a pore diameter within a range of 40 to 100 Å was 0.328 mL/g and the median pore diameter was 51 Å. Moreover, as a result of determining pore properties of catalyst A by mercury intrusion porosimetry, the volume of pores with a pore diameter within a range of 0.05 to 0.5 μm was 0.085 mL/g, and the volume of pores with a pore diameter of 0.5 μm to 10 μm was 0.001 mL/g. Furthermore, the volume of pores with a pore diameter within a range of 0.05 to 1 μm was 0.086 mL/g, and the volume of pores with a pore diameter within a range of 1 to 10 μm was less than 0.001 mL/g.

Figure 1:
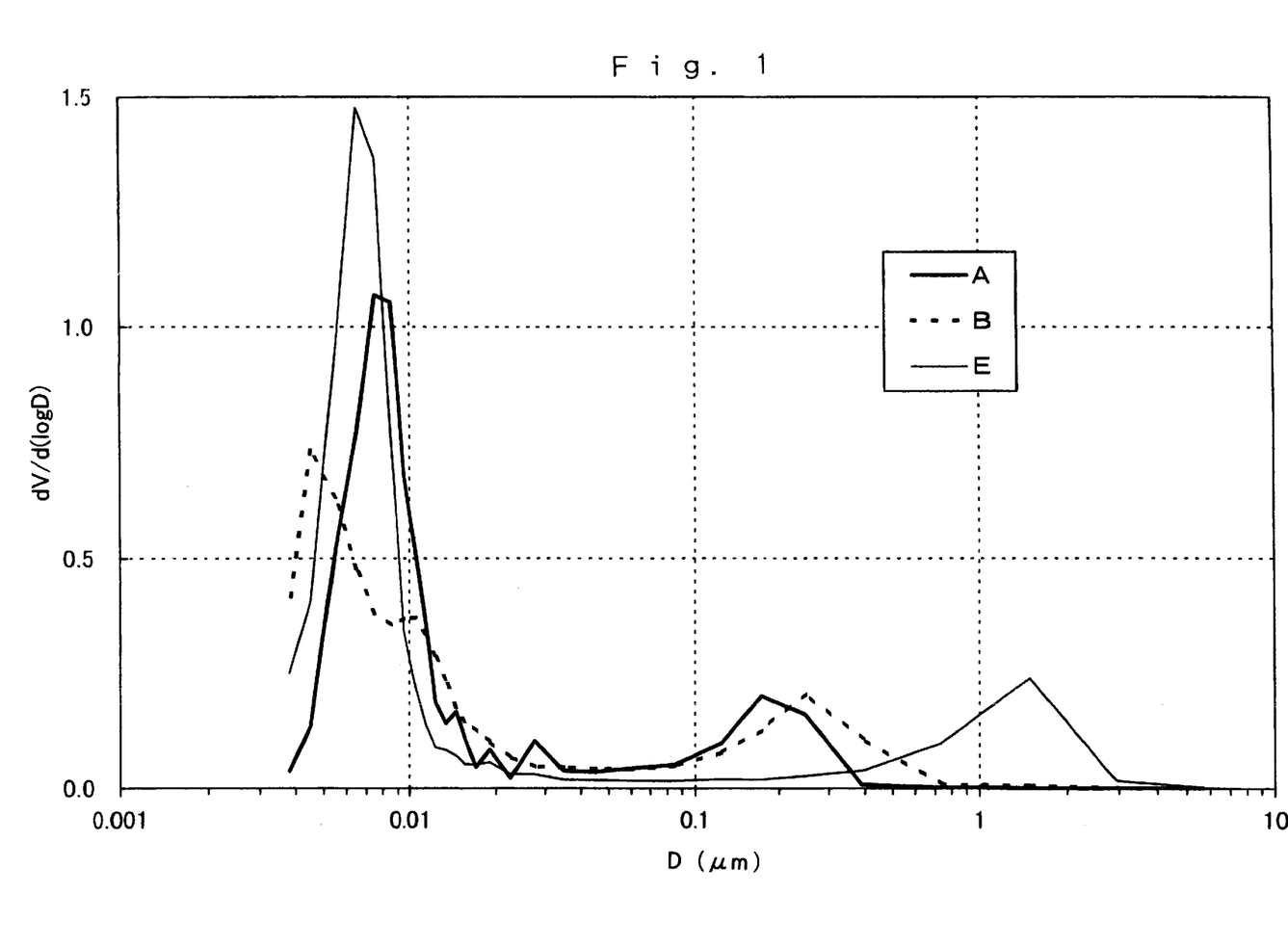
FIG. 1 is a graph showing pore diameter distribution of a hydrocracking catalyst made by the examples and comparative examples of the present invention. A and B in the graph show pore diameter distribution of catalysts A and B produced by the examples, and E shows pore diameter distribution of catalyst E made by the comparative example. The vertical and horizontal axes of the graph indicate dV/d(log D) and D, respectively, wherein V is pore volume and D is pore diameter.

The pore properties of catalyst A are shown by line A in FIG. 1. There is a sharp peak within the range of a pore diameter of 40 to 100 Å (mesopores), and there is also an obvious peak within a range of 0.05 to 0.5 μm (macropores).

In addition, mean side crushing strength of this catalyst A was 5.9 kg.

[Catalyst B]

As will be described below, catalyst B consisting of 16.5 wt % W, 1.5 wt % Ni, 61.1 wt % silica-alumina, 0.8 wt % USY zeolite, and 15.5 wt % alumina was prepared.

First, 1,372 g silica-alumina powder (silica/alumina molar ratio of 4.4, 94.4 wt % of which was powder of particle aggregates with a diameter of 1 to 10 μm, ignition loss of 16.9 wt %), 16.1 g USY zeolite (silica/alumina molar ratio of 30.3, Na content of 0.02 wt %, lattice constant of 24.29 Å, 67.9 wt % of which was particle aggregates with a diameter of 1 to 10 μm, ignition loss of 10.6 wt %), and 395 g pseudo-boehmite powder (ignition loss of 27.0 wt %) were kneaded while being mixed, and shaped into a cylindrical shape by extrusion from a round opening with a diameter of 1.6 mm. Then a carrier of a silica-alumina/USY zeolite/alumina mixture was prepared by drying this shaped article for 15 hours at 130° C. and firing for 1 hour at 600° C. under an air flow. The mean side crushing strength of this carrier was 4.0 kg.

The carrier was impregnated by spraying with an aqueous ammonium metatungstate solution and dried for 15 hours at 130° C. Then it was impregnated by spraying with an aqueous nickel nitrate solution and dried for 15 hours at 130° C. Next, it was fired for 30 minutes at 500° C. under an air flow. Catalyst B was thereby obtained.

When the pore properties of this catalyst B were measured by nitrogen gas adsorption, the volume of pores with a pore diameter within a range of 40 to 100 Å was 0.279 mL/g and the median pore diameter was 52 Å. Moreover, as a result of determining pore properties of catalyst B by mercury intrusion porosimetry, the volume of pores with a pore diameter within a range of 0.05 to 0.5 μm or larger was 0.101 mL/g, and the volume of pores with a pore diameter of 0.5 μm to 10 μm was 0.004 mL/g. Furthermore, the volume of pores with a pore diameter within a range of 0.05 to 1 μm was 0.104 mL/g, and the volume of pores with a pore diameter of 1 μm to 10 μm was 0.001 mL/g.

The pore properties of catalyst B are shown by line B in FIG. 1. As with catalyst A, there is a sharp peak within the range of a pore diameter of 40 to 100 Å (mesopores), and there is also an obvious peak within a pore diameter range of 0.05 to 0.5 μm (macropores).

In addition, mean side crushing strength of this catalyst A was 4.4 kg.

[Catalyst C]

As will be described below, catalyst C consisting of 22.0 wt % W, 2.0 wt % Ni, 50.9 wt % silica-alumina, 4.9 wt % USY zeolite, and 13.9 wt % boria-alumina was prepared.

First, 1,136 g silica-alumina powder (silica/alumina molar ratio of 7.4, 93.4 wt % of which was powder of particle aggregates with a diameter of 1 to 10 μm, ignition loss of 16.4 wt %), 102 g USY zeolite (silica/alumina molar ratio of 30.3, Na content of 0.02 wt %, lattice constant of 24.29 Å, 67.9 wt % of which was particle aggregates with a diameter of 1 to 10 μm, ignition loss of 10.6 wt %), and 324 g boria-alumina powder (boron content of 2.6 wt %, ignition loss of 19.7 wt %) were kneaded and mixed and shaped into a cylindrical shape by extrusion from a round opening with a diameter of 1.6 mm. Then a carrier of a silica-alumina/USY zeolite/boria-alumina mixture was prepared by drying this shaped article for 15 hours at 130° C. and firing for 1 hour at 600° C. under an air flow. The mean side crushing strength of this carrier was 6.6 kg.

The carrier was impregnated by spraying with an aqueous ammonium metatungstate solution and dried for 15 hours at 130° C. Then it was impregnated by spraying with an aqueous nickel nitrate solution and dried for 15 hours at 130° C. Next, it was fired for 30 minutes at 500° C. under an air flow. Catalyst C was thereby obtained.

When the pore properties of this catalyst C were measured by nitrogen gas adsorption, the volume of pores with a pore diameter within a range of 40 to 100 Å was 0.194 mL/g and the median pore diameter was 69 Å. Moreover, as a result of determining pore properties of catalyst C by mercury intrusion porosimetry, the volume of pores with a pore diameter within a range of 0.05 to 0.5 μm was 0.076 mL/g, and the volume of pores with a pore diameter of 0.5 μm to 10 μm was 0.001 mL/g. Mean side crushing strength of this catalyst C was 8.4 kg.

[Catalyst D]

As will be described below, catalyst D consisting of 22.0 wt % W, 2.0 wt % Ni, 53.3 wt % silica-alumina, 2.4 wt % USY zeolite, and 13.9 wt % alumina was prepared.

First, 1,143 g silica-alumina powder (silica/alumina molar ratio of 4.4, 94.4 wt % of which was powder of particle aggregates with a diameter of 1 to 10 μm, ignition loss of 16.9 wt %), 49 g USY zeolite (silica/alumina molar ratio of 30.3, Na content of 0.02 wt %, lattice constant of 24.29 Å, 67.9 wt % of which was particle aggregates with a diameter of 1 to 10 μm, ignition loss of 10.6 wt %), and 340 g pseudo-boehmite powder (ignition loss of 27.0 wt %) were kneaded while being mixed, and shaped into a cylindrical shape by extrusion from a round opening with a diameter of 1.6 mm. Then a carrier of a silica-alumina/USY zeolite/alumina mixture was prepared by drying this shaped article for 15 hours at 130° C. and firing for 1 hour at 600° C. under an air flow. The mean side crushing strength of this carrier was 4.0 kg.

The carrier was impregnated by spraying with an aqueous ammonium metatungstate solution and dried for 15 hours at 130° C. Then it was impregnated by spraying with an aqueous nickel nitrate solution and dried for 15 hours at 130° C. Next, it was fired for 30 minutes at 500° C. under an air flow. Catalyst D was thereby obtained.

When the pore properties of this catalyst D were measured by nitrogen gas adsorption, the volume of pores with a pore diameter within a range of 40 to 100 Å was 0.231 mL/g and the median pore diameter was 52 Å. Moreover, as a result of determining pore properties of catalyst D by mercury intrusion porosimetry, the volume of pores with a pore diameter within a range of 0.05 to 0.5 μm was 0.070 mL/g, and the volume of pores with a pore diameter of 0.5 μm to 10 μm or larger was 0.003 mL/g. Furthermore, the volume of pores with a pore diameter within a range of 0.05 to 1 μm was 0.072 mL/g, and the volume of pores with a pore diameter within a range of 1 to 10 μm was 0.001 mL/g.

Mean side crushing strength of this catalyst D was 4.7 kg.

[Hydrocracking Reaction Using Catalyst A and Catalyst B]

Evaluation method 1:

Catalyst A was packed in a fixed bed flow-through reactor which has 100 milliliters packing volume, and pre-sulfiding was performed therein. Then hydrocracking was performed under reaction conditions of a pressure of 15 MPa, a hydrogen/starting oil feed ratio of 800 NL/L, LHSV=1.36 h$^{-1}$, and reaction temperature of 390, 380, 370 and 360° C. using vacuum gas oil with a density at 15° C. of 0.831 g/mL, initial boiling point of 262.9° C., 97.8 wt % fractions with a boiling point of 293° C. or higher, total sulfur concentration less than 0.001 wt %, total nitrogen concentration less than 0.0001 wt %, vanadium concentration less than 0.0001 wt %, and nickel concentration less than 0.0001 wt %. When the reaction temperature needed to convert the fractions with a boiling point of 293° C. or higher at a conversion rate of 60 wt % and the middle distillate yield within a boiling point range of 127 to 293° C. at this conversion rate were determined, they were 376.4° C. and 39.9 wt %, respectively.

Catalyst B was similarly packed in the reactor and a hydrocracking reaction was performed under the same conditions as described above. When the reaction temperature needed to convert the fraction with a boiling point of 293° C. or higher at a conversion rate of 60 wt % and the middle distillate yield within a boiling point range of 127 to 293° C. at this conversion rate were determined, they were 367.7° C. and 40.3 wt %, respectively.

Evaluation Method 2:

Moreover, catalyst A was evaluated as follows under conditions that were different from those described above. Catalyst A was packed in the above-mentioned fixed-bed flow-through reactor and hydrocracking was performed under reaction conditions of a pressure of 15 MPa, a hydrogen/starting oil feed ratio of 800 NL/L, an LHSV=1.36 $h^{-1}$, and a reaction temperature of 380° C. When the conversion rate of fractions with a boiling point of 293° C. or higher and middle distillate yield within a boiling point range of 127 to 293° C. were determined, they were 64.5 wt % and 64.4 wt %, respectively.

Catalyst B was packed in the above-mentioned fixed-bed flow-through reactor, and hydrocracking was performed therein under reaction conditions of a pressure of 15 MPa, a hydrogen/starting oil feed ratio of 800 NL/L, an LHSV= 1.36 $h^{-1}$, and a reaction temperature of 380° C. When the conversion rate of fractions with boiling point of 293° C. or higher and middle distillate yield within a boiling point range of 127 to 293° C. were determined, they were 79.2 wt % and 48.9 wt %, respectively.

[Hydrocracking Using Catalyst C and Catalyst D]

Evaluation method 1:

Catalyst A was packed in a fixed bed flow-through reactor with 100 milliliters packing volume, and pre-sulfiding was performed therein. Then hydrocracking with performed under reaction conditions of a pressure of 15 MPa, a hydrogen/starting oil feed ratio of 1,000 NL/L, LHSV=1.36 $h^{-1}$, and reaction temperature of 420, 410, and 400° C. using vacuum gas oil with a density at 15° C. of 0.9060 g/mL, initial boiling point of 309.3° C., 91.3 wt % fractions with a boiling point of 360° C. or higher, total sulfur concentration 0.46 wt %, total nitrogen concentration 0.081 wt %, vanadium concentration less than 0.0001 wt %, and nickel concentration less than 0.0001 wt %. When the reaction temperature needed to convert the fraction with a boiling point of 360° C. or higher at a conversion rate of 60 wt % and the middle distillate yield within a boiling point range of 127 to 360° C. at this conversion rate were determined, they were 410.0° C. and 41.2 wt %, respectively.

Catalyst D was similarly packed in the reactor and a hydrocracking reaction was performed under the same conditions as described above. When the reaction temperature needed to convert the fraction with a boiling point of 360° C. or higher at a conversion rate of 60 wt % and the middle distillate yield within a boiling point range of 127 to 360° C. at this conversion rate were determined, they were 411.9° C. and 45.6 wt %, respectively.

Evaluation Method 2:

Moreover, catalysts C and D were evaluated as follows under conditions that were different from those described above.

Catalyst C was packed in the above-mentioned fixed-bed flow-through reactor and hydrocracking was performed under reaction conditions of a pressure of 15 MPa, a hydrogen/starting oil feed ratio of 1,000 NL/L, an LHSV= 1.36 $h^{-1}$, and a reaction temperature of 400° C. When the conversion rate of fractions with a boiling point of 360° C. or higher and middle distillate yield within a boiling point range of 127 to 360° C. were determined, they were 40.9 wt % and 72.4 wt %, respectively.

Moreover, catalyst D was packed in the above-mentioned fixed-bed flow-through reactor and hydrocracking was performed under reaction conditions of a pressure of 15 MPa, a hydrogen/starting oil feed ratio of 1,000 NL/L, an LHSV= 1.36 $h^{-1}$, and a reaction temperature of 400° C. When the conversion rate of fractions with a boiling point of 360° C. or higher and middle distillate yield within a boiling point range of 127 to 360° C. were determined, they were 39.4 wt % and 81.3 wt %, respectively.

Comparative Example

[Catalyst E]

As will be described below, catalyst E consisting of 11.0 wt % W, 1.0 wt % Ni, 67.9 wt % silica-alumina, 17.0 wt % alumina was prepared.

First, 1,137 g silica-alumina powder (silica/alumina molar ratio of 4.1, 34.4 wt % of which was powder of particle aggregates with a diameter of 1 to 10 μm, ignition loss of 23.9 wt %), and 296 g pseudo-boehmite powder (ignition loss of 27.0 wt %) were kneaded while being mixed, and shaped into a cylindrical shape by extrusion from a round opening with a diameter of 1.6 mm. Then a carrier of a silica-alumina/alumina mixture was prepared by drying this shaped article for 15 hours at 130° C. and firing for 1 hour at 600° C. under an air flow. The mean side crushing strength of this carrier was 2.1 kg. The carrier was impregnated by spraying with an aqueous ammonium metatungstate solution and dried for 15 hours at 130° C. Then it was impregnated by spraying with an aqueous nickel nitrate solution and dried for 15 hours at 130° C. Next, it was fired for 30 minutes at 500° C. under an air flow. Catalyst E was thereby obtained.

When the pore properties of this catalyst E were measured by nitrogen gas adsorption, the volume of pores with a pore diameter within a range of 40 to 100 Å was 0.442 mL/g and the median pore diameter was 62 Å. Moreover, as a result of determining pore properties of catalyst E by mercury intrusion porosimetry, the volume of pores with a pore diameter within a range of 0.05 to 0.5 μm was 0.026 mL/g, and the volume of pores with a pore diameter of 0.5 μm to 10 μm was 0.105 mL/g. Furthermore, the volume of pores with a pore diameter within a range of 0.05 to 1 μm was 0.053 mL/g, and the volume of pores with a pore diameter within a range of 1 to 10 μm was 0.078 mL/g.

The pore properties of catalyst E are shown by line E in FIG. 1. As with catalyst A, a sharp peak is seen within a pore diameter range of 40 to 100 Å (mesopores). Nevertheless, in contrast to catalysts A and B, the peak of the macropores appears in the range where pore diameter exceeds 1 μm.

Mean side crushing strength of this catalyst A was 3.2 kg.

[Hydrocracking Reaction Using Catalyst E]

Evaluation method 1:

Catalyst E were packed in a fixed bed flow-through reactor with 100 milliliters packing volume, and hydrocracking was performed therein as with catalysts A and B. When the reaction temperature needed to convert the fraction with a boiling point of 293° C. or higher at a conversion rate of 60 wt % and the middle distillate yield within a boiling point range of 127 to 293° C. at this conversion rate were determined, they were 378.8° C. and 37.0 wt %, respectively.

Evaluation Method 2:

Catalyst E was packed in a fixed-bed flow-through reactor with a catalyst packing volume of 100 ml, and hydrocracking was performed therein under the same conditions as evaluation method 2 used for catalyst A. When the conversion rate of fraction with a boiling point of 293° C. or higher and middle distillate yield within a boiling point range of 127 to 293° C. were found, they were 59.6 wt % and 61.0 wt %, respectively.

The determination devices and methods used in the above-mentioned examples and comparative examples are listed below:

[Method of Determining Particle Diameter Distribution of Particle Aggregates]

Particle diameter distribution of particle aggregates was determined using the MICROTRAC particle diameter analyzer made by Nikkiso Co., Ltd. This involved dispersing powder in water and irradiating laser light onto the groups of particle aggregates flowing through the water in order to analyze their particle diameter distribution based on the forward-scattered light.

[Method of Determining Pore Properties]

The AutoPore 9200 made by Micromeritics was used to determine pore properties by mercury intrusion porosimetry. The ASAP 2400 made by Micromeritics was used to determine pore properties by nitrogen gas adsorption.

[Method of Determining Mean Side Crushing Strength]

Side crushing strength was determined for a sample that had been extrusion shaped into a cylinder, dried and fired using the TH-203CP tablet breaking strength meter made by Toyama Sangyo Co., Ltd. The determination probe had a round tip with a diameter of 5 mm. The procedure whereby collapsing strength was measured in the center of the edge of the cylindrical determination sample was repeated 20 times and the mean value was calculated.

[Definition of Conversion Rate and Middle Distillate Yield]

The conversion rate and middle distillate selectivity, which show activity of the catalysts in the examples and the comparative example were defined as described below:

> conversion rate of fractions with boiling point of 293° C. or higher=(1−(wt % of fractions with boiling point of 293° C. or higher of product oil/wt % of fractions with a boiling point of 293° C. or higher of starting oil)]×100 (wt %)
>
> conversion rate of fractions with boiling point of 360° C. or higher=[1−(wt % of fractions with boiling point of 360° C. or higher of product oil/wt % of fractions with a boiling point of 360° C. or higher of starting oil)]×100 (wt %)
>
> middle distillate yield within boiling point range of 127 to 293° C.=[(weight of fractions within a boiling point range of 127 to 293° C. in product)/weight of product excluding hydrogen sulfide and ammonia)]×100 (wt %)
>
> middle distillate yield within boiling point range of 127 to 360° C.=[(weight of fraction within boiling point range of 127 to 360° C.)/(weight of product excluding hydrogen sulfide and ammonia)]×100 (wt %)

[Indicators of Cracking Activity and Middle Distillate Selectivity]

The reaction temperature needed to convert the fractions with a boiling point of 293° C. or higher at a conversion rate of 60 wt % and the middle distillate yield within a boiling point range of 127 to 293° C., which are shown as indicators of cracking activity and middle distillate selectivity of the catalysts of the examples and the comparative example, were calculated as described below:

The apparent reaction rate constant at each reaction temperature was calculated for the reaction whereby the fractions with a boiling point of 293° C. or higher are converted with the apparent order of reaction in terms of the concentration of fraction with a boiling point of 293° C. or higher being secondary. An Arrhenius plot was drawn and the Arrhenius formula was obtained. The reaction temperature needed to convert the fraction with a boiling point of 293° C. or higher at a conversion rate of 60 wt % was calculated based on the Arrhenius plot that was obtained. The conversion rate of fraction with a boiling point of 293° C. or higher from the experimental results at each reaction temperature was plotted on the axis of abscissas and the middle distillate yield within the boiling point range of 127 to 293° C. was plotted on the axis of ordinates to obtain an approximation curve showing the correlation between the conversion rate and the middle distillate yield. The middle distillate yield within a boiling point range of 127 to 293° C. when the conversion rate of the fraction with a boiling point of 293° C. or higher was 60 wt % was calculated from this approximation curve.

The reaction temperature needed to convert the fractions with a boiling point of 360° C. or higher at a conversion rate of 60 wt % and the middle distillate yield within a boiling point range of 127 to 360° C. at this conversion rate were calculated as described below:

The apparent reaction rate constant at each reaction temperature was calculated for the reaction whereby the fractions with a boiling point of 360° C. or higher are converted with the apparent order of the reaction in terms of the concentration of the fraction with a boiling point of 360° C. or higher being secondary, and an Arrhenius plot was made and the Arrhenius formula was obtained. The reaction temperature needed to convert the fractions with a boiling point of 360° C. or higher at a conversion rate of 60 wt % was calculated based on the Arrhenius formula that was obtained. The conversion rate of fractions with a boiling point of 293° C. or higher from the experimental results at each reaction temperature was plotted on the axis of abscissas, while the middle distillate yield of the boiling point range of 127 to 360° C. was plotted on the axis of ordinate to obtain an approximation curve showing the correlation between the conversion rate and the middle distillate yield. The middle distillate yield of the boiling point range of 127 to 360° C. when the conversion rate of fraction with a boiling point of 360° C. or higher was 60 wt % was calculated.

Industrial Applicability

The hydrocracking catalyst of the present invention has a specific pore structure of both mesopores and macropores and therefore is sufficiently strong mechanically. At the same time, excellent hydrocracking performance is realized and efficient hydrocracking is possible with respect to hydrocarbon oils containing 80 wt % or more of a fraction with a boiling point of, for instance, 250° C. or higher, particularly vacuum gas oil.

What is claimed is:

1. A hydrocracking catalyst comprising:
   a carrier having particles of an inorganic oxide and a binder component present between the particles; and
   at least one metal component supported on the carrier and selected from Group 6, Group 9, and Group 10 of the Periodic Table, wherein the median pore diameter of the catalyst is 40 to 100 Å and the volume of pores having a pore diameter within a range of 40 to 100 Å ranges from 0.15 to 0.6 mL/g, and the volume of pores of the catalyst with a pore diameter within a range of 0.05 to 0.5 μm ranges from 0.05 to 0.13 mL/g and the volume of pores with a pore diameter within a range of 0.5 to 10 μm is less than 0.01 mL/g.

2. A hydrocracking catalyst according to claim 1, wherein the inorganic oxide is made up of at least one inorganic oxide selected from the group consisting of silica-alumina, silica-titania, silica-zirconia, silica-magnesia, silica-alumina-titania, and silica-alumina-zirconia.

3. A hydrocracking catalyst according to claim 1, wherein the inorganic oxide is comprised of at least one inorganic oxide selected from the group consisting of silica-alumina, silica-titania, silica-zirconia, silica-magnesia, silica-alumina-titania, and silica-alumina-zirconia; and USY zeolite.

4. A hydrocracking catalyst according to any one of claims 1 to 3, wherein the binder component comprises at least one of alumina and boria-alumina.

5. A hydrocracking catalyst according to any one of claims 1 to 3, wherein the diameter of at least 60% of the particles of the inorganic oxide is 10 μm or less.

6. A hydrocracking catalyst according to claim 1, which is used for hydrocracking hydrocarbon oils containing 80 wt % or more of fractions with a boiling point of 250° C. or higher.

7. A hydrocracking catalyst according to claim 1 or claim 6, which is used for hydrocracking hydrocarbon oil whose vanadium and nickel contents are both 0.0005 wt % or less.

8. A hydrocracking catalyst according to claim 7, wherein said hydrocarbon oil is vacuum gas oil and the vanadium content and nickel content of the vacuum gas oil are both 0.0001 wt % or less.

9. A hydrocracking catalyst according to claim 1, wherein the median pore diameter of the catalyst is in the range of 50 to 85 Å.

10. A method of producing a hydrocracking catalyst, defined in claim 1, comprising the steps of:

mixing inorganic oxide powder comprising at least 60 wt % of particle aggregates with a diameter of 10 μm or less and binder;

shaping, drying and firing the mixture of the powder and binder to form the carrier; and supporting at least one metal component selected from Group 6, Group 9, and Group 10 of the Periodic Table on the carrier.

11. A method of producing a hydrocracking catalyst according to claim 10, wherein the inorganic oxide powder is made from at least one selected from the group consisting of silica-alumina, silica-titania, silica-zirconia, silica-magnesia, silica-alumina-titania, and silica-alumina-zirconia.

12. A method of producing a hydrocracking catalyst according to claim 10, wherein the inorganic oxide powder is made from at least one selected from the group consisting of silica-alumina, silica-titania, silica-zirconia, silica-magnesia, silica-alumina-titania, and silica-alumina-zirconia; and USY zeolite.

13. A method of producing a hydrocracking catalyst according to any one of claims 10 to 12, wherein the binder component is made from at least one of hydrated aluminium oxide and boria-containing hydrated aluminium oxide.

14. A method of producing a hydrocracking catalyst according to any one of claims 10 to 12, wherein the median pore diameter of the inorganic oxide powder ranges from 35 to 100 Å.

15. A method of hydrocracking hydrocarbon oils comprising contacting said hydrocarbon oils under hydrocracking conditions with the hydrocracking catalyst defined in claim 1 in the presence of hydrogen.

16. A hydrocracking method according to claim 15, characterized in that the hydrocarbon oil is hydrocarbon oil containing 80 wt % or more of fractions with a boiling point of 250° C. or higher.

17. A hydrocracking method according to claim 15 or 16, wherein the vanadium content and nickel content of the hydrocarbon oil are both 0.0005 wt % or lower.

18. A hydrocracking method according to claim 17, wherein the hydrocarbon oil is vacuum gas oil and the vanadium content and nickel content contained in the vacuum gas oil are both 0.0001 wt % or less.

* * * * *

UNITED STATES PATENT AND TRADEMARK OFFICE
CERTIFICATE OF CORRECTION

PATENT NO. : 6,551,500 B1  Page 1 of 1
DATED : April 22, 2003
INVENTOR(S) : Katsuaki Ishida et al.

It is certified that error appears in the above-identified patent and that said Letters Patent is hereby corrected as shown below:

<u>Title page,</u>
Item [86], should read:
-- [86]  PCT No.:        PCT/JP99/04722
         §371 (c)(1),
         (2), (4) Date:  May 25, 2000 --

Signed and Sealed this

Twenty-seventh Day of January, 2004

JON W. DUDAS
*Acting Director of the United States Patent and Trademark Office*